(12) United States Patent
Harayama et al.

(10) Patent No.: US 11,312,065 B2
(45) Date of Patent: Apr. 26, 2022

(54) BUILDING APPARATUS AND BUILDING METHOD

(71) Applicant: MIMAKI ENGINEERING CO., LTD., Nagano (JP)

(72) Inventors: Kenji Harayama, Nagano (JP); Takuya Matsushima, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 487 days.

(21) Appl. No.: 16/199,241

(22) Filed: Nov. 26, 2018

(65) Prior Publication Data

US 2019/0160731 A1 May 30, 2019

(30) Foreign Application Priority Data

Nov. 29, 2017 (JP) .............................. JP2017-229038

(51) Int. Cl.
| | |
|---|---|
| *B29C 64/112* | (2017.01) |
| *B29C 64/35* | (2017.01) |
| *B29C 64/393* | (2017.01) |
| *B33Y 10/00* | (2015.01) |
| *B33Y 30/00* | (2015.01) |
| *B29C 64/209* | (2017.01) |
| *B33Y 50/02* | (2015.01) |
| *B33Y 40/00* | (2020.01) |

(Continued)

(52) U.S. Cl.
CPC .......... *B29C 64/112* (2017.08); *B29C 64/209* (2017.08); *B29C 64/264* (2017.08); *B29C 64/35* (2017.08); *B29C 64/393* (2017.08); *B33Y 10/00* (2014.12); *B33Y 30/00* (2014.12); *B33Y 40/00* (2014.12); *B33Y 50/02* (2014.12); *B41J 2002/1657* (2013.01)

(58) Field of Classification Search
None
See application file for complete search history.

(56) References Cited

U.S. PATENT DOCUMENTS

2017/0266889 A1* 9/2017 Takahashi ............... B29C 64/40

FOREIGN PATENT DOCUMENTS

| | | |
|---|---|---|
| EP | 1805024 | 7/2007 |
| EP | 3219469 | 9/2017 |

(Continued)

OTHER PUBLICATIONS

"Search Report of Europe Counterpart Application", dated Apr. 26, 2019, p. 1-p. 8.

*Primary Examiner* — Matthew J Daniels
*Assistant Examiner* — Paul Spiel
(74) *Attorney, Agent, or Firm* — JCIPRNET

(57) ABSTRACT

A building apparatus configured to build an object includes inkjet heads serving as a plurality of ejection heads, a scanning driver, and a maintenance unit configured to perform a maintenance of the inkjet head. The scanning driver allows a plurality of inkjet heads to perform at least a main scanning operation and allows the inkjet head to perform the main scanning operation multiple times until building of the object is completed. The maintenance unit performs the maintenance of the inkjet head in an interval between two successive main scanning operations and performs the predetermined maintenance for only part of a plurality of inkjet heads in each maintenance. Hence, building with high accuracy is performed more appropriately.

15 Claims, 7 Drawing Sheets

(51) Int. Cl.
*B41J 2/165* (2006.01)
*B29C 64/264* (2017.01)

(56) References Cited

FOREIGN PATENT DOCUMENTS

| JP | 2015071282 | 4/2015 |
| WO | 2017099163 | 6/2017 |

* cited by examiner

BUILDING APPARATUS AND BUILDING METHOD

CROSS REFERENCE TO RELATED APPLICATIONS

This application claims the priority benefit of Japan application serial no. 2017-229038, filed on Nov. 29, 2017. The entirety of the above-mentioned patent application is hereby incorporated by reference herein and made a part of this specification.

BACKGROUND OF THE INVENTION

Technical Field

The present invention relates to a building apparatus and a building method.

Background Art

Building apparatuses (3D printer) that build objects using inkjet heads have been known (for example, see Patent Literature 1). In such a building apparatus, for example, an object is built by additive manufacturing by building up a plurality of layers of ink formed by inkjet heads.
Patent Literature 1: Japanese Unexamined Patent Publication No. 2015-071282.

SUMMARY

In building by additive manufacturing, each layer of ink is typically formed into a constant thickness, for example, using a flattening roller. In such a configuration, layers of ink with a constant thickness are regularly deposited. This configuration therefore can appropriately prevent streaks (deposition streaks) caused by deposition of layers from becoming excessively noticeable. The inventor of the subject application has conducted an experiment to actually build objects of various shapes and has found that the state of deposition streaks at positions corresponding to some layers of ink is sometimes different from the other part, which makes the state of deposition streaks noticeable. In this case, the surface of the object may appear different from the intended state due to the noticeable deposition streaks, and the quality of the object may be reduced. The present invention is then aimed to provide a building apparatus and a building method capable of solving the problem described above.

The inventor of the subject application has conducted elaborate studies as to the reason why the state of deposition streaks at some positions is different from the state at the other positions. The inventor then has found that the portion where the deposition streak is noticeable is at the position corresponding to the timing when a maintenance of the inkjet heads is conducted during building. More specifically, when inkjet heads are used, maintenance such as cleaning of heads need to be performed periodically in order to eject ink stably. When building is performed in a building apparatus, continuous operation for a long time is required, and therefore, the maintenance of the inkjet head may be performed during the progress of building. In this case, the maintenance is automatically performed, for example, at regular intervals (for example, about once an hour) during building. The inventor of the subject application has examined the relation between the timing when the maintenance is performed and the timing when each layer of ink is formed and has found that the portion where the deposition streak is noticeable is at the position corresponding to the timing when the maintenance is performed.

The inventor of the subject application has conducted further elaborate studies and found that the deposition streak is noticeable because the time in which the operation of building is stopped for maintenance is long. More specifically, for example, in a case where head cleaning is performed as the maintenance, the operation of building is usually temporarily stopped to perform head cleaning. In this case, the operation of building is usually stopped for about a few minutes (for example, about 2 to 5 minutes). In this regard, the inventor of the subject application has examined the effect caused by temporarily stopping the operation of building, through an experiment and the like. This experiment has shown that a deposition streak is likely to be noticeable when the stop time is longer than a certain level. Based on the experiment result and the like, the inventor has noticed that the noticeability of the deposition streak as described above is attributable to that the time required for the maintenance of the inkjet heads is long. In this experiment, the inventor of the subject application has also confirmed that sufficiently reducing the time of stopping the operation of building can reduce the possibility that the deposition streak becomes noticeable. The inventor then has contemplated performing maintenance such as cleaning for a shorter time.

In this respect, in a building apparatus, for example, a large number of inkjets are sometimes used for building using different kinds of ink of different colors for different applications. Then, in such a case, the inventor has noticed that the time for maintenance is long because a large number of inkjet heads are targeted in each time of the maintenance operation. The inventor then has contemplated reducing a building stop time involved with the maintenance by reducing the number of inkjet heads targeted for maintenance in each time of maintenance. More specifically, in this case, the inventor has contemplated performing maintenance of the inkjet heads by performing the maintenance of only part (for example, one inkjet head) of a plurality of inkjet heads included in a building apparatus in each maintenance and successively changing an inkjet head selected as a maintenance target. It has also been found that by doing so, the maintenance of the inkjet heads can be performed appropriately while noticeability of deposition streaks is prevented.

The inventor of the subject application has conducted further elaborate studies and found features necessary for achieving such effects. This finding has led to completion of the present invention. In order to solve the problem above, the present invention provides a building apparatus configured to build a three-dimensional object. The building apparatus includes a plurality of ejection heads each configured to eject a material used for building the object, a scanning driver configured to allow the ejection heads to perform a scanning operation of moving relative to the object being built, and a maintenance unit configured to perform the maintenance of the ejection head. The scanning driver allows the ejection heads to perform at least a main scanning operation of ejecting the material while moving in a preset main scanning direction relative to the object being built, as the scanning operation, and allows the ejection head to perform the main scanning operation multiple times until building of the object is completed. The maintenance unit performs predetermined maintenance of the ejection head in an interval between two successive main scanning operations of the main scanning operation performed multiple times and performs the predetermined maintenance for only part of the ejection heads in each time of maintenance operation performed in the interval between the two successive main scanning operations.

In such a configuration, the time required for each time of maintenance is appropriately reduced by reducing the number of ejection heads targeted in each time of maintenance. This can also reduce, for example, the building stop time involved with maintenance. This configuration therefore can appropriately prevent, for example, occurrence of unintended noticeable deposition streaks. With this configuration, for example, building with high accuracy can be performed more appropriately.

The maintenance unit performs, for example, cleaning of the ejection head as the predetermined maintenance of the ejection head. With such a configuration, for example, the material for building adhering to the ejection head during ejection can be removed appropriately. The ejection head thus can be kept in a good state. For example, an inkjet head can be suitably used as the ejection head. In this case, the ejection head has, for example, a nozzle configured to eject ink as the material of building by inkjet. In this case, the maintenance unit may perform, for example, a nozzle check as the predetermined maintenance of the ejection head. Performing nozzle check means that, for example, checking the operation of the nozzle in the ejection head. With such a configuration, for example, if an error occurs in the nozzle in the ejection head, the error can be appropriately detected. This can appropriately prevent the ejection head with an error from keeping building. When an error of the nozzle is detected in the nozzle check, for example, cleaning of the ejection head may be performed.

In this configuration, the building apparatus may build the object, for example, by deposing layers of the material for building in a deposition scanning direction orthogonal to the main scanning direction. In this case, the scanning driver allows, for example, the ejection heads to further perform a deposition scanning operation of moving in the deposition scanning direction relative to the object being built, as the scanning operation. The ejection head performs the deposition scanning operation multiple times until building of the object is completed. In this case, the maintenance of the ejection head may be performed, for example, after any one of the layers is formed and before formation of the next layer is started, in the operation of deposing the material for building. More specifically, in this case, the maintenance unit performs the maintenance of the ejection head, for example, after the main scanning operation performed immediately before part of the deposition scanning operation performed multiple times. The scanning driver allows the ejection heads to perform the next main scanning operation after the maintenance of the ejection head by the maintenance unit is completed. With such a configuration, for example, the maintenance of the ejection head can be performed appropriately during the operation of building the object by additive manufacturing.

In this configuration, for example, a material (for example, UV curable ink) to be cured by radiation of ultraviolet rays can be suitably used as the material for building. In this case, the building apparatus further includes, for example, a UV light source. The UV light source, for example, emits ultraviolet rays during the main scanning operation to irradiate the material ejected by the ejection head with ultraviolet rays. With such a configuration, for example, the object can be built appropriately.

In this configuration, for example, the maintenance unit performs the maintenance of the ejection head every time a certain amount of time has elapsed. In this case, the maintenance unit performs the maintenance of each ejection head by successively changing the ejection head selected as the maintenance target every time the maintenance operation is performed. More specifically, in this case, for example, the maintenance unit performs the maintenance operation multiple times until building of the object is completed, by performing the maintenance operation at each of predetermined timings with multiple times of the scanning operation interposed. In each maintenance operation, the maintenance unit selects an ejection head not targeted in the previous maintenance as the ejection head serving as the maintenance target. In this case, the ejection head serving as the maintenance target refers to an ejection head serving as a predetermined maintenance target. With this configuration, for example, maintenance can be performed appropriately for a plurality of ejection heads in the building apparatus while the time required for each time of maintenance is reduced.

In order to reduce the time required for each time of maintenance, it is preferable to minimize the number of ejection heads targeted in each time of maintenance. Therefore, in this point of view, it is preferable that the maintenance unit performs the maintenance of only one of the ejection heads in each maintenance operation.

The ejection head serving as the maintenance target may be selected considering how the ejection head is used, rather than making a selection equally for the ejection heads. In this case, for example, the ejection head serving as the maintenance target may be selected according to the use frequency of ejection heads. The ejection head frequently used indicates, for example, a large amount of material is ejected until building is completed. More specifically, for example, when the use frequency varies among a plurality of ejection heads in the building apparatus, the ejection heads include a first ejection head frequently used and a second ejection head less frequently used. Then, the first ejection head ejects a larger amount of material than the second ejection head until building of the object is completed. Then, in such a case, the maintenance unit selects an ejection head serving as the maintenance target in each maintenance operation, for example, such that the number of times the predetermined maintenance is performed for the first ejection head is greater than the number of times the predetermined maintenance is performed for the second ejection head until building of the object is completed. With such a configuration, for example, the maintenance of the ejection head frequently used can be performed with higher frequency. With this configuration, for example, the maintenance can be performed appropriately according to the use frequency of the ejection heads.

According to another aspect, the present invention provides a building method having the similar features as described above. Also in this case, for example, the similar effects as described above can be achieved. The building method may be considered as, for example, a method of manufacturing an object.

According to the present invention, building can be appropriately performed with high accuracy.

BRIEF DESCRIPTION OF THE DRAWINGS

FIGS. 1A and 1B are diagrams illustrating an exemplary building apparatus 10 according to an embodiment of the present invention, in which FIG. 1A illustrates an exemplary configuration of a main part of the building apparatus 10 and FIG. 1B illustrates an exemplary configuration of a head 12 in the building apparatus 10.

FIGS. 3A and 3B are diagrams illustrating an exemplary detailed configuration of a maintenance unit 18, in which FIG. 3A is a top view of the maintenance unit 18 and FIG. 3B is a perspective view of the maintenance unit 18.

FIGS. 4A and 4B illustrate an experiment conducted by the inventor of the subject application, in which FIGS. 4A and 4B are photographs illustrating results of the experiment.

FIGS. 6A and 6B are diagrams illustrating an exemplary configuration of a flattening roller unit 106, in which FIGS. 6A and 6B are perspective views of the flattening roller unit 106 as viewed from different angles.

FIGS. 7A and 7B are diagrams illustrating an exemplary configuration of the flattening roller unit 106, in which FIG. 7A is a perspective view of the flattening roller unit 106 with a fixing member 314 being removed in the flattening roller unit 106, and FIG. 7B is a perspective view of a state in which the fixing member 314 is removed and an ink tray 306 and the like are further detached from the other part of the flattening roller unit 106.

DESCRIPTION OF EMBODIMENTS

Figure 1A:
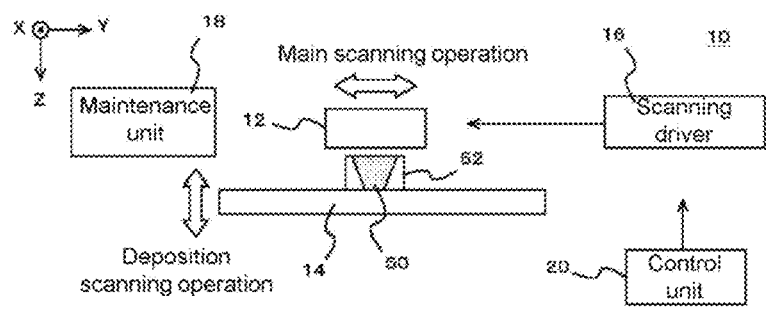
Figure 1B:
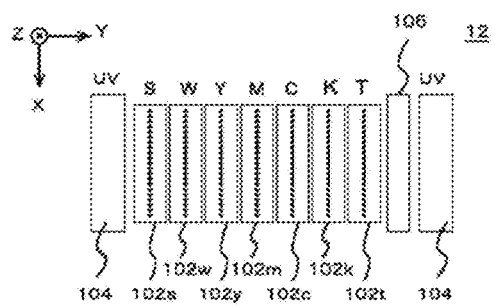

Embodiments according to the present invention will be described below with reference to the attached drawings. FIGS. 1A and 1B illustrate an exemplary building apparatus 10 according to an embodiment of the present invention. FIG. 1A illustrates an exemplary configuration of a main part of the building apparatus 10. FIG. 1B illustrates an exemplary configuration of a head 12 in the building apparatus 10.

The building apparatus 10 may have the same or similar features as a known building apparatus, except for the points described below. More specifically, except for the points described below, the building apparatus 10 may have the same or similar features as a known building apparatus that performs building by ejecting droplets of a material of an object 50 using inkjet heads. The building apparatus 10 may further include, for example, a variety of configurations necessary for building an object 50 in addition to the configuration illustrated in the figures.

In this example, the building apparatus 10 is a building apparatus (3D printer) that builds a three-dimensional object 50 by additive manufacturing. In this case, additive manufacturing refers to a method of building an object 50, for example, by building up a plurality of layers. The object 50 refers to, for example, a three-dimensional structure. In this example, the building apparatus 10 includes a head 12, a stage 14, a scanning driver 16, a maintenance unit 18, and a control unit 20.

The head 12 is a part ejecting the material used for building the object 50. The material used for building the object 50 refers to, for example, the material of the object 50. In this example, ink is used as the material of the object 50. In this case, ink refers to, for example, a functional liquid. In this example, ink may be considered as, for example, a liquid ejected from an inkjet head. In this case, the inkjet head refers to, for example, an ejection head ejecting droplets of ink by inkjet.

More specifically, the head 12 ejects ink that cures depending on a predetermined condition from a plurality of inkjet heads, as the material of the object 50. Then, the droplets of ink are hardened after landing to add layers to form the object 50. In this example, an ultraviolet (UV) curable ink (UV ink) that is cured from a liquid state by radiation of ultraviolet rays is used as the ink. In this case, the UV curable ink is an example of the material that is cured by radiation of ultraviolet rays. The head 12 further ejects a material of a support layer 52 as a material used for building the object 50, in addition to the material of the object 50. The head 12 thus forms the support layer 52 around the periphery of the object 50, if necessary. The support layer 52 refers to, for example, a deposited structure formed under an overhang-shaped portion during building, for example, when the object 50 having an overhang shape is built. The support layer 52 is formed if necessary during building of the object 50 and is removed after completion of building. A more specific configuration of the head 12 will be described in detail later.

The stage 14 is a table-like member supporting the object 50 being built and is disposed at a position opposed to the ink heads in the head 12, and the object 50 being built is placed on an upper surface of the stage 14. In this example, the stage 14 is configured such that at least its upper surface is movable in a deposition scanning direction (the Z direction in the figure) and is driven by the scanning driver 16 so that at least the upper surface is moved with the progress of building of the object 50. In this case, the deposition scanning direction is, for example, a direction in which the material of building is deposited in additive manufacturing. More specifically, in this example, the deposition scanning direction is a direction orthogonal to a main scanning direction (the Y direction in the figure) and a sub scanning direction (the X direction in the figure) preset in the building apparatus 10.

The scanning driver 16 is a driver that allows the head 12 to perform a scanning operation of moving relative to the object 50 being built. In this case, moving relative to the object 50 being built means, for example, moving relative to the stage 14. Allowing the head 12 to perform the scanning operation means, for example, allowing the inkjet heads in the head 12 to perform the scanning operation. In this example, the scanning driver 16 allows the head 12 to perform the main scanning operation (Y scanning), the sub scanning operation (X scanning), and the deposition scanning operation (Z scanning).

The main scanning operation is, for example, an operation of ejecting ink while moving in the main scanning direction relative to the object 50 being built. In this example, the scanning driver 16 allows the head 12 to perform a main scanning operation by moving the head 12 while fixing the position of the stage 14 in the main scanning direction. In a modified configuration of the building apparatus 10, for example, the position of the head 12 in the main scanning direction may be fixed and the object 50 may be moved, for example, by moving the stage 14. As will be described in more detail later, in this example, the head 12 further has a UV light source. Then, during the main scanning operation, the scanning driver 16 further drives the UV light source in the head 12.

The sub scanning operation is, for example, an operation of moving relative to the object 50 being built in the sub scanning direction orthogonal to the main scanning direction. More specifically, the sub scanning operation is, for example, the operation of moving relative to the stage 14 in the sub scanning direction by a preset feed amount. In this example, the scanning driver 16 allows the head 12 to perform the sub scanning operation in an interval between main scanning operations. In this case, the scanning driver 16 allows the head 12 to perform the sub scanning operation, for example, by moving the stage 14 while fixing the position of the head 12 in the sub scanning direction. Alternatively, the scanning driver 16 may allow the head 12 to perform the sub scanning operation by moving the head 12 while fixing the position of the stage 14 in the sub scanning direction.

The deposition scanning operation is, for example, an operation of moving the head 12 in the deposition scanning direction relative to the object 50 being built by moving at least one of the head 12 or the stage 14 in the deposition scanning direction. In this case, moving the head 12 in the deposition scanning direction means, for example, moving at least the inkjet heads in the head 12 in the deposition scanning direction. Moving the stage 14 in the deposition scanning direction means, for example, moving the position of at least the upper surface of the stage 14. The scanning driver 16 allows the head 12 to perform a deposition scanning operation with the progress of the operation of building to adjust the relative position of the inkjet heads to the object 50 being built in the deposition scanning direction. More specifically, in the deposition scanning operation in this example, the scanning driver 16 moves the stage 14 while fixing the position of the head 12 in the deposition scanning direction. The scanning driver 16 may move the head 12 while fixing the position of the stage 14 in the deposition scanning direction.

Here, as explained above, in this example, the building apparatus 10 builds the object 50 by additive manufacturing. Then, in this case, in the operation of forming each layer of ink to form the object 50, the scanning driver 16 allows the head 12 to perform the main scanning operation and the sub scanning operation, for example, the required number of times according to a cross-sectional shape of the object. In this case, the head 12 performs the main scanning operation at least once in forming each layer. Thus, the scanning driver 16 allows the head 12 to perform the main scanning operation multiple times until the building of the object 50 is completed. In this example, the scanning driver 16 allows the head 12 to perform a deposition scanning operation after allowing the head 12 to perform the last main scanning operation that is performed in forming each layer of ink and before allowing the head 12 to perform an initial main scanning operation that is performed in forming the next layer. The building apparatus 10 thus deposits layers of ink in the deposition scanning direction to build the object. In this case, at a timing of performing some of the deposition scanning operation, the maintenance unit 18 is allowed to perform maintenance of the inkjet heads in the head 12.

The maintenance unit 18 is a configuration for performing maintenance of the inkjet heads in the head 12. In this example, the maintenance unit 18 performs cleaning of the inkjet heads as maintenance of the inkjet heads. In this case, cleaning is an example of predetermined maintenance. The cleaning of the inkjet heads refers to, for example, the operation of wiping a nozzle surface of a nozzle, which is a surface having nozzles in an inkjet head, with a wiper. The nozzles are minute openings for ejecting ink by inkjet in the inkjet heads. With such a configuration, for example, ink and the like adhering to the inkjet heads during ejection can be appropriately removed. This keeps the inkjet heads clean. The timing of performing maintenance and the operation of maintenance in the maintenance unit 18 will be described in more detail later.

The control unit 20 is, for example, a central processing unit (CPU) of the building apparatus 10 and controls each unit in the building apparatus 10 to control the operation of building in the building apparatus 10. More specifically, the control unit 20 controls each unit in the building apparatus 10, for example, based on the shape information, color information, etc. of the object 50 to be built. According to this example, the object 50 can be built appropriately.

A more specific configuration of the head 12 will now be described. In this example, the head 12 has a plurality of inkjet heads, a plurality of UV light sources 104, and a flattening roller unit 106. In this case, the plurality of inkjet heads are an example of a plurality of ejection heads each ejecting the material used for building an object 50. As illustrated in FIG. 1B, the head 12 has an inkjet head 102s, an inkjet head 102w, an inkjet head 102y, an inkjet head 102m, an inkjet head 102c, an inkjet head 102k, and an inkjet head 102t, as the plurality of inkjet heads. These inkjet heads are disposed, for example, side by side in the main scanning direction so as to be aligned in the sub scanning direction. These inkjet heads each have a nozzle row having a plurality of nozzles arranged in a row in a predetermined nozzle row direction on a surface opposed to the stage 14. In this example, the nozzle row direction is a direction parallel to the sub scanning direction.

Of these inkjet heads, the inkjet head 102s is an inkjet head for ejecting a material of the support layer 52. In this example, a UV curable ink having a lower curability by ultraviolet rays than the material of the object 50 is used as the material of the support layer 52. For example, a known material for support layers can be suitably used as the material of the support layer 52. The inkjet head 102w is an inkjet head for ejecting white (W) ink and forms an interior region forming the interior of the object 50 with white ink. In this case, white ink is an example of a light-reflective ink and used to, for example, form a region having a light-reflecting property (light-reflective region) in the object 50. In this example, the interior region is formed with white ink so that the interior region also functions as a light-reflective region. The interior region and the light-reflective region may be formed as separate regions. In this case, the interior region may be formed with ink other than white ink.

The inkjet head 102y, the inkjet head 102m, the inkjet head 102c, and the inkjet head 102k (hereinafter referred to as inkjet heads 102y to 102k) are inkjet heads for coloring for use in building a colored object 50. More specifically, the inkjet head 102y ejects yellow (Y) ink. The inkjet head 102m ejects magenta (M) ink. The inkjet head 102c ejects cyan (C) ink. The inkjet head 102k ejects black (K) ink. In this case, the colors Y, M, C, and K are an example of process colors for full color representation. The inkjet head 102t is an inkjet head for ejecting clear ink. The clear ink refers to, for example, colorless and transparent (T) clear ink.

The plurality of UV light sources 104 are light sources (UV light sources) for curing ink and generate ultraviolet rays for curing UV curable ink. In this example, a plurality of UV light sources 104 are disposed on one end side and the other end side of the head 12 in the main scanning direction such that the row of inkjet heads is sandwiched therebetween. For example, ultraviolet LEDs (UVLEDs) can be suitably used as UV light sources 104. Alternatively, metal halide lamps or mercury lamps may be used as UV light sources 104.

The flattening roller unit 106 is flattening means for flattening a layer of ink formed during building of the object 50. The flattening roller unit 106 is a unit member having a flattening roller and flattens a layer of ink, for example, by bringing the flattening roller into contact with the surface of the layer of ink during the main scanning operation and removing part of the ink before curing. The head 12 having a configuration as described above can be used to appropriately form the layer of ink forming the object 50. The object 50 can be built appropriately by building up a plurality of layers of ink.

The specific configuration of the head 12 is not limited to the configuration described above and can be modified in various ways. For example, the head 12 may have an inkjet head for a color other than YMCK as an inkjet head for coloring. The head 12 may further have an inkjet head for ejecting a building material ink (Mo ink) as an inkjet head for forming the interior region. In this case, the building material ink refers to, for example, ink dedicated for building the interior region to be used by the object 50. The arrangement of a plurality of inkjet heads in the head 12 may also be modified in various ways. For example, some of the inkjet heads may be displaced from the other inkjet heads in the sub scanning direction.

A timing of maintenance and an operation of maintenance in the maintenance unit 18 will now be described in more detail. In this example, the maintenance unit 18 has the same or similar configuration as, for example, the known maintenance unit that performs cleaning of inkjet heads. In this case, a known maintenance unit refers to, for example, a maintenance unit that performs cleaning of inkjet heads in a known inkjet printer or building apparatus. As used herein, having the same or similar configuration as a known maintenance unit means, for example, that a member included in the maintenance unit is the same or similar as that of the known maintenance unit. Therefore, the operation of maintenance performed in the maintenance unit in this example partially differs from that of the known maintenance unit.

More specifically, in this example, the maintenance unit 18 performs cleaning of only part of the inkjet heads in the head 12, rather than cleaning all of the inkjet heads in the head 12, in each time of maintenance operation. In this case, each time of maintenance operation refers to an operation of a series of maintenance performed in an interval between formation of two successive layers of ink, namely, after formation of the lower layer and before start of formation of the upper layer. In this case, the maintenance unit 18 performs cleaning of inkjet head(s), for example, at a timing illustrated in the flowchart in FIG. 2.

Figure 2:
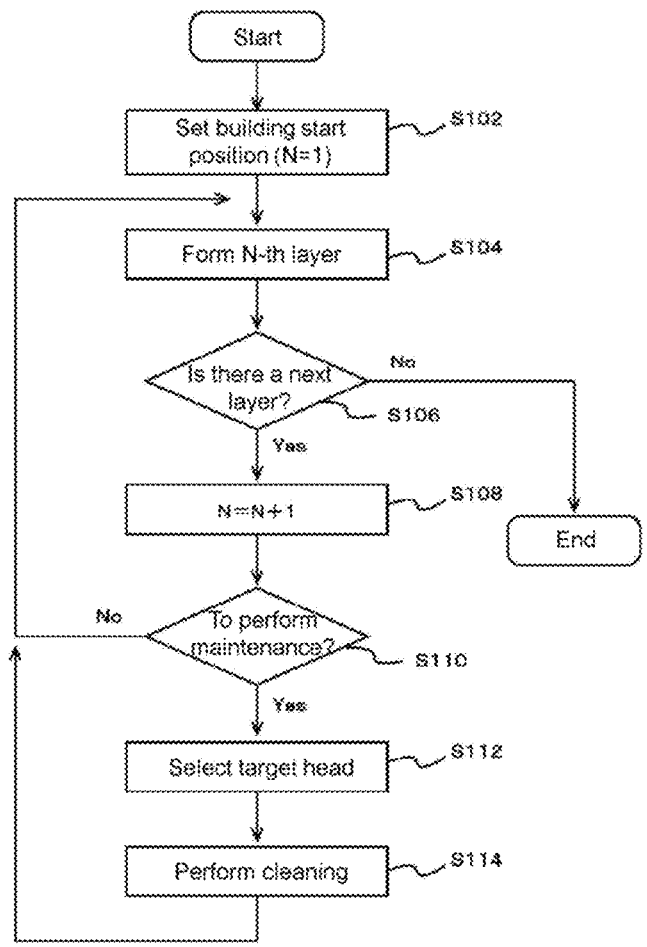
FIG. 2 is a flowchart illustrating an example of an operation of building performed in the building apparatus 10.

FIG. 2 is a flowchart illustrating an example of the operation of building performed in the building apparatus 10 and illustrates an example of the operation of building, focusing on the timing of maintenance performed in the maintenance unit 18. In this example, the building apparatus 10 builds an object 50, based on slice data representing cross sections of the object 50. Building the object 50 based on slice data means that the object 50 is built by additive manufacturing, for example, by successively forming layers of ink corresponding to slice data representing cross sections at different positions in the deposition scanning direction. In this operation of building, first of all, a building start position is set corresponding to a bottom layer to be formed during building (S102). In this case, setting the building start position means that, for example, a variable indicating the position of a cross section of the object 50 is set to an initial value. In the case illustrated in the figure, the building start position is set by setting the value of a variable N indicating a layer number counted from the bottom in the deposition scanning direction to 1.

After the building start position is set, a layer of ink is formed based on slice data indicating a cross section corresponding to the variable N. In this way, the N-th layer of ink from the bottom (the N-th layer) is formed (S104). More specifically, in this case, the first layer of ink is formed immediately after the value of N is initialized to 1. In the operation of forming the layer of ink, the building apparatus 10 performs the main scanning operation at least once. In addition, the sub scanning operation is performed at an interval between main scanning operations, if necessary. As used herein, "the building apparatus 10 performs the main scanning operation or the sub scanning operation" means that the scanning driver 16 in the building apparatus 10 allows the head 12 to perform the main scanning operation or the sub scanning operation.

After the layer of ink is formed at step S104, it is determined whether the next layer of ink exists (S106). In this case, determining whether the next layer of ink exists means determining whether building has been completed. In this example, if the formation of layers of ink corresponding to slice data at all positions of cross sections has been completed, the building apparatus 10 determines that the next layer of ink does not exist and building has been completed. In this case (No at S106), the building apparatus 10 finishes the operation of building.

If it is determined that the next layer of ink exists, at step S106 (Yes at S106), the building apparatus 10 continues the operation of building. In this case, the value of the variable N indicating the position of the cross section of the object 50 is incremented by 1 (S108). In this case, as the value of the variable N is incremented, the building apparatus 10 performs a deposition scanning operation to change the position of the stage 14. As used herein "the building apparatus 10 performs a deposition scanning operation" means that the scanning driver 16 allows the head 12 to perform a deposition scanning operation.

Before formation of the next layer of ink is started, it is determined whether to perform maintenance of inkjet head (s) by the maintenance unit 18 (S110). In this example, the maintenance unit 18 performs maintenance of inkjet head(s) every time a plurality of layers of ink are formed, by performing maintenance at intervals of a certain amount of time, rather than performing maintenance every time one layer of ink is formed. In this case, for example, whether maintenance is necessary may be determined by determining whether a predetermined amount of time has elapsed since the previous maintenance is performed. More specifically, in this example, for example, a predetermined amount of time from 30 minutes to 2 hours or so (for example, about 1 hour) is set as an interval time of maintenance, and it is determined whether the interval time has elapsed since the previous maintenance is performed. The maintenance unit 18 thus performs maintenance of inkjet head(s) every time a certain amount of time has elapsed. Whether maintenance is necessary may be determined not based on a time but based on the number of layers of ink formed. In this case, it is determined to perform maintenance if at least a predetermined number of layers of ink are formed since the previous maintenance is performed.

If it is determined not to perform maintenance at step S110 (No at S110), the process returns to step S104 and the subsequent operation is repeated. The next layer of ink is thus formed. If it is determined to perform maintenance at step S110 (Yes at S110), an inkjet head is selected as a maintenance target (S112). In this case, selecting the inkjet head as the maintenance target means selecting an inkjet head to be cleaned in the current maintenance operation. More specifically, as described above, in this example, the maintenance unit 18 performs cleaning of only part of the inkjet heads in the head 12, rather than cleaning all the inkjet heads in the head 12, in each time of maintenance operation. Therefore, only part of the inkjet heads is selected from among the plurality of inkjet heads in the head 12 before performing each maintenance. In this example, only one inkjet head is selected in each time of the maintenance operation.

In this case, the maintenance unit 18 selects an inkjet head (an inkjet head that is not the target of the previous maintenance) different from the previous one in each maintenance. The maintenance unit 18 thus changes the inkjet head selected as the maintenance target every time the maintenance operation is performed.

After the inkjet head as the maintenance target is selected, cleaning of the selected inkjet head is performed (S114). In this case, the maintenance unit 18 performs cleaning of the inkjet head, for example, by wiping the nozzle surface of the inkjet head with a wiper. In this example, in the operation at step S114, the inkjet head as the maintenance target performs flushing before wiping. The flushing refers to, for example, an operation (purge operation) of ejecting ink from each nozzle for the purpose of performing maintenance of the inkjet head. More specifically, in this example, the inkjet head as the maintenance target performs flushing by ejecting ink from each nozzle of inkjet at a predetermined position in the building apparatus 10. Wiping is then performed on the inkjet head after flushing. After cleaning of the selected inkjet head is completed, the process returns to step S104 and the subsequent operation is repeated. The next layer of ink is then formed.

According to this example, layers of ink forming the object 50 can be appropriately formed while the maintenance operation is performed in an interval. The object 50 thus can be built appropriately while the state of each inkjet head in the head 12 is maintained well. As described above, in this example, the maintenance unit 18 performs the maintenance operation at each predetermined timing. For this reason, for example, when building takes a long time, for example, when a large object 50 is to be built, the maintenance operation is performed multiple times until the building of the object is completed. Then, in this case, the maintenance unit 18 successively selects each of a plurality of inkjet heads in the head 12 in each maintenance in rotation in a preset order. According to this example, therefore, maintenance can be appropriately performed successively for the plurality of inkjet heads in the head 12. In this case, in each maintenance, only part of the inkjet heads is set as a cleaning target, rather than cleaning all the inkjet heads in the head 12, thereby appropriately reducing the time required for each time of maintenance.

As described above, in this example, the inkjet head as the maintenance target performs flushing before wiping. With this configuration, for example, preferable maintenance for an inkjet head frequently used and preferable maintenance for an inkjet head less frequently used can be performed appropriately. In this case, the inkjet head frequently used indicates that, for example, more ink is ejected before building is completed. More specifically, in the case of the inkjet head frequently used, the nozzle surface tends to be contaminated, for example, due to mist produced in ejection of ink. In this respect, in this example, wiping is performed for the inkjet head serving as the maintenance target to appropriately remove the contamination on the nozzle surface. In an inkjet head less frequently used, nozzle clogging is likely to occur when ink is not ejected from nozzles for a long time. In this respect, in this example, the inkjet head as the maintenance target performs flushing, thereby appropriately preventing nozzle clogging even when the inkjet head is less frequently used.

When the inkjet head performs flushing, this operation may cause contamination on the nozzle surface. Therefore, in this example, only the inkjet head to be wiped immediately after flushing performs flushing. With this configuration, for example, when the nozzle surface is contaminated during flushing, the contamination can be appropriately removed. The maintenance operation, for example, including flushing and wiping in combination thus can be performed appropriately.

In order to prevent nozzle clogging, the inkjet head may be sucked rather than flushing of the inkjet head. As used herein "the inkjet head is sucked" means that, for example, sucking is performed such that the nozzle surface of the inkjet head is covered with a cap member for sucking to allow ink to pass through each nozzle. Also in this case, it is preferable that only the inkjet head to be wiped immediately after sucking is sucked. This configuration also can prevent, for example, nozzle clogging appropriately.

Various features of maintenance performed in this example will now be described in more detail. As described above, in this example, the maintenance unit 18 performs maintenance of the inkjet head by wiping the nozzle surface of the inkjet head. Then, in this case, cleaning of one inkjet head takes, for example, about 10 to 30 seconds (for example, about 20 seconds). Therefore, assuming that cleaning is performed for all the inkjet heads in the head 12 in each time of the maintenance operation, each time of the maintenance operation takes a few minutes or longer (for example, about three minutes or longer). As a result, the building stop time during maintenance amounts to a few minutes or longer.

When only a deposition scanning operation is performed without performing maintenance of the inkjet head in the interval between formation of two successive layers of ink, a time required for the deposition scanning operation is, for example, about 2 to 5 seconds or shorter. Then, in the case where maintenance of the inkjet head is performed periodically during the operation of building as in this example, when each time of the maintenance operation requires a few minutes or longer, an amount of time of the interval between formation of two successive layers of ink significantly differs between when maintenance is performed and when maintenance is not performed. Then, in this case, as will be described in more detail later, an unintended noticeable deposition streak may occur at a position corresponding to the timing when maintenance is performed in the object 50.

By contrast, according to this example, the number of inkjet heads targeted in each maintenance is reduced, so that the time required for each time of maintenance can be greatly reduced. For example, this also can reduce a building stop time involved with maintenance and sufficiently reduce the difference in the amount of time of the interval between formation of two successive layers of ink between when maintenance is performed and when maintenance is not performed. As a result, the unintended noticeable deposition streak corresponding to the timing when maintenance is performed in the object 50 can be appropriately prevented. Therefore, according to this example, for example, reduction in quality of the object 50 can be appropriately prevented.

When cleaning is performed for only one inkjet head in each time of the maintenance operation as in this example, for example, it is preferable to increase the frequency of maintenance, compared with when all the inkjet heads are targeted in each time of the maintenance operation. However, even in this case, the time required for each time of the maintenance operation is shorter and therefore the time required for building does not significantly increase.

As can be understood from the flowchart illustrated in FIG. 2, when building is performed by additive manufacturing, the head 12 performs the deposition scanning operation multiple times until building of the object 50 is completed. Also in this case, the maintenance operation is performed at each of predetermined timings with multiple times of the deposition scanning operation interposed, so that the maintenance operation is performed multiple times until building of the object 50 is completed. In the foregoing description, for convenience of explanation, the maintenance operation is performed after the deposition scanning operation. However, in a more specific operation of the building apparatus 10, the maintenance operation may be started before the deposition scanning operation is completed. In this case, maintenance of the inkjet head may be performed, for example, in the operation of depositing layers of ink, after any one layer is formed and before formation of the next layer is started.

When the timing of maintenance is considered in relation with the timing of a main scanning operation, the maintenance unit 18 performs maintenance of the inkjet head in the head 12 in the interval between two successive main scanning operations of the main scanning operation performed multiple times by the head 12 during building. More specifically, in this case, the maintenance unit 18 performs maintenance of the inkjet head, for example, after the main scanning operation performed immediately before part of the deposition scanning operation performed multiple times. In this case, the scanning driver 16 allows the head 12 to perform the next main scanning operation after maintenance of the inkjet head 102 by the maintenance unit 18 is completed. With this configuration, maintenance of the inkjet head can be appropriately performed, for example, during the operation of building the object by additive manufacturing.

As described above, in this example, only one inkjet head is targeted in each time of maintenance. In this respect, to reduce the time required for each time of maintenance, it is preferable that the number of inkjet heads targeted in each time of maintenance is minimized. However, in a modification of the operation of building apparatus 10, two or more inkjet heads may be targeted in each time of maintenance depending on the desired quality and the like of building. Also in this case, only part of the inkjet heads in the head 12 is selected as the maintenance target, so that the time required for each time of maintenance can be appropriately reduced. Also in this case, for example, the inkjet head selected during each maintenance is successively changed, so that maintenance can be appropriately performed for all the inkjet heads in the head 12.

Maintenance such as cleaning of inkjet heads has conventionally been performed, for example, in inkjet printers that print two-dimensional images. However, in the inkjet printer, maintenance of inkjet heads is usually performed after completion of printing of an image or before start of printing, rather than during printing of an image. In this case, taking time for maintenance does not affect the quality and the like of printing. In the inkjet printer, therefore, cleaning is performed for a plurality of inkjet heads in the inkjet printer at the same time in each time of maintenance. By contrast, when an object is built in a building apparatus, inkjet heads are used continuously for a long time, compared with printing of a two-dimensional image, and therefore maintenance is required during building of one object. As a result, if the time required for each time of maintenance is long, the quality and the like of building may be affected. Therefore, the operation of maintenance of the inkjet head in this example can be considered as, for example, an operation closely related to the feature in building the object.

Figure 3A:
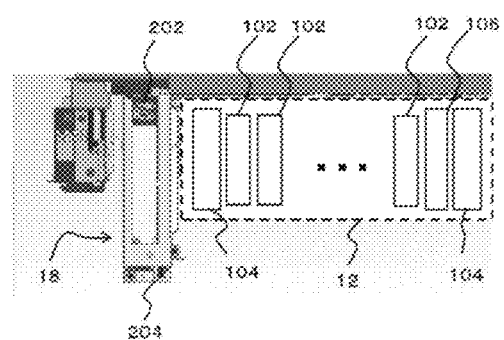
Figure 3B:
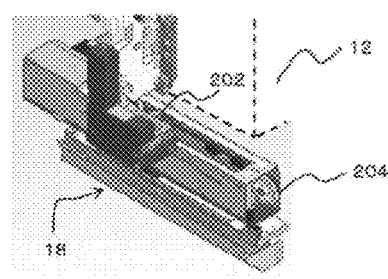

A specific configuration for cleaning the inkjet head will now be described in more detail. FIGS. 3A and 3B are diagrams illustrating an exemplary detailed configuration of a maintenance unit 18. FIG. 3A is a top view of the maintenance unit 18 as viewed from above in the deposition scanning direction. FIG. 3B is a perspective view of the maintenance unit 18.

In FIGS. 3A and 3B, for convenience of illustration, the maintenance unit 18 is illustrated together with a head 12 illustrated in a simplified manner. For simplification of illustration, all the inkjet heads in the head 12 are denoted by the same reference numeral (102). The maintenance unit 18 may have the same or similar configuration as a known maintenance unit, except for the points described above and below.

In this example, the maintenance unit 18 has a wiper 202 and a wiper driver 204. The wiper 202 is a member for wiping the nozzle surface of the inkjet head 102. During maintenance, the wiper 202 performs wiping by moving in a predetermined direction in contact with the nozzle surface of the inkjet head 102 selected as the maintenance target. The wiper driver 204 is driving means for moving the wiper 202 during maintenance. With this configuration, for example, cleaning of the inkjet head 102 can be performed appropriately.

Here, the head 12 has a plurality of inkjet heads 102 as described above. By contrast, in this example, the maintenance unit 18 has only one wiper 202. In this respect, in order to reduce the time required for maintenance, for example, it may be possible to provide wipers 202 and wiper drivers 204 as many as the inkjet heads 102 in the head 12 in the maintenance unit 18. Using multiple sets of wiper 202 and wiper driver 204 reduce the time required for maintenance even when all of the inkjet heads 102 are cleaned in each time of the maintenance operation.

However, in the building apparatus 10, various kinds of ink need to be used and thus a large number of inkjet heads 102 need to be used as explained with reference to, for example, FIGS. 1A and 1B. Then, in this case, providing the maintenance unit 18 with wipers 202 or the like as many as the inkjet heads 102 in the head 12 leads to significant size increase and cost increase of the maintenance unit 18. By contrast, in this example, the number of inkjet heads 102 targeted in each time of maintenance is reduced, thereby appropriately preventing occurrence of the unintended noticeable deposition streak in the object 50 while preventing such a problem.

As described above, in this example, cleaning is performed only for one inkjet head 102 using one wiper 202 in each time of the maintenance operation. In a modification of the operation of the building apparatus 10, cleaning may be performed by using one wiper 202 for a plurality of inkjet heads 102 in order in each maintenance operation. In this case, it is preferable that the number of inkjet heads 102 targeted for each time of the maintenance operation is set such that the time required for each time of maintenance is sufficiently short, depending on the desired quality and the like of building. More specifically, in this case, it is preferable that inkjet heads 102 fewer than all the inkjet heads 102 in the head 12 are targeted for each time of the maintenance operation as far as the unintended noticeable deposition streak is not produced in the object 50.

In a modified configuration of the maintenance unit 18, two or more wipers 202 may be provided in the maintenance unit 18. With such a configuration, maintenance can be performed appropriately for the plurality of inkjet heads 102, for example, while the time required for each time of maintenance is reduced. Also in this case, it is preferable that wipers 202 are fewer than the inkjet heads 102 in the head 12. Also in this case, for example, cleaning is performed for only part of the inkjet heads 102 in the head 12 by targeting only the inkjet heads 102 as many as the wipers 202 in each maintenance. Such a configuration also appropriately prevents occurrence of the unintended noticeable deposition streak in the object 50 while preventing significant size increase and cost increase of the maintenance unit 18.

Figure 4A:
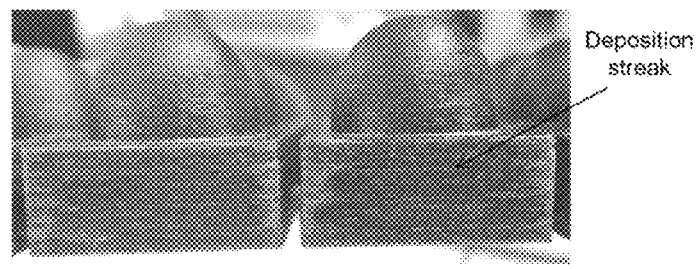
Figure 4B:
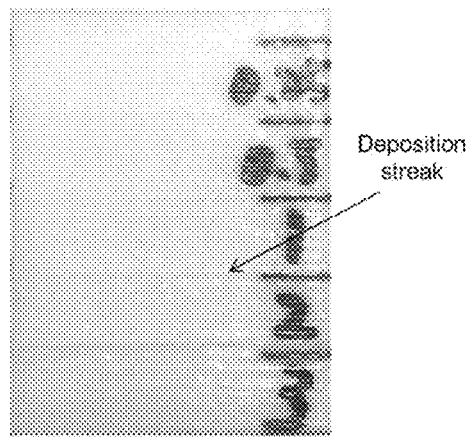

The experiments and the like conducted by the inventor of the subject application will now be described. FIGS. 4A and 4B illustrate an experiment conducted by the inventor of the subject application and are photographs of the result of some of various experiments conducted by the inventor of the subject application. FIGS. 4A and 4B are photographs illustrating the result of an experiment. More specifically, FIG. 4A illustrates an example of the result of cleaning of inkjet heads performed regularly by a conventional method and illustrates an example of the result of building an object in the shape of a hemisphere on a rectangular parallelepiped. In this case, cleaning of inkjet heads regularly by the conventional method means that cleaning is performed for all the inkjet heads in the head in each time of the maintenance operation and maintenance of the inkjet heads is performed regularly at predetermined intervals.

In this case, for example, three noticeable deposition streaks extending in the lateral direction in the figure at regular intervals are observed in the rectangular parallelepiped part of the object. These deposition streaks occur at positions corresponding to the timings when cleaning was performed and at intervals corresponding to the timings when cleaning was performed. It is understood that deposition streaks are noticeable due to regular cleaning as described above.

The appearance of deposition streaks produced in the object usually varies to some extent depending on, for example, the shape of the object. Therefore, in the photograph in FIG. 4A, the streaks in the hemisphere part is slightly less visible. However, in this experiment result, noticeable deposition streaks compared with other deposition streaks are also formed corresponding to the timings of cleaning in the hemisphere part.

As described above, a cause of occurrence of such noticeable streaks is thought to be related to a time in which the operation of building is temporarily stopped for maintenance is long. The inventor of the subject application then examined the effect of stopping the operation of building, through various experiments. FIG. 4B is a photograph illustrating the result of an experiment in which building was performed while the time of temporarily stopping the operation of building was changed. In the photograph, the numeral written on the object indicates the time at which the operation of building was temporarily stopped during building (building stop time). As illustrated in the figure, in this experiment, the building stop time was changed to 3 minutes, 2 minutes, 1 minute, 0.5 minute, and 0.25 minute, and a change in noticeability of deposition streaks was observed. As can be seen in the photograph, when the building stop time was 3 minutes, the deposition streak was extremely noticeable. It was also confirmed that reducing the building stop time reduces the possibility that noticeable deposition streaks occur.

Remarks to the configuration described above and a description of additional modifications will now be given. As described above, when building is performed by additive manufacturing, increasing the building stop time at some timings during building may cause noticeable deposition streaks. In this respect, for example, the length of the building stop time seems to be irrelevant to the quality and the like of building, if ink is completely cured during formation of each layer of ink. However, in practice, curing ink in each layer of ink to the extent that completely eliminates the effect of building stop time may significantly increase the integrated amount of ultraviolet rays emitted by the UV light sources. This may lead to size increase and cost increase of the apparatus. The integrated amount of ultraviolet rays emitted during formation of each layer of ink need to be adjusted considering the effects other than the appearance of deposition streaks. Therefore, if the radiation intensity and the like of ultraviolet rays are changed only in view of the appearance of deposition streaks, unintended side effects may occur. By contrast, this example can appropriately prevent, for example, occurrence of noticeable deposition streaks without changing the manner of radiation of ultraviolet rays during formation of each layer of ink.

When focusing on the building stop time, we may consider the maintenance operation in this example as a preferable operation especially when there is a difference in appearance of deposition streaks, for example, due to the effect of the building stop time. The unnecessary building stop time caused by performing maintenance is preferably set, more specifically, for example, about 30 seconds or shorter. Such a configuration can appropriately prevent, for example, formation of noticeable deposition streaks. In this case, it may be preferable that the number of inkjet heads targeted for maintenance in each time of the maintenance operation is set such that the time required for each time of maintenance is 30 seconds or shorter.

The manner of maintenance of the inkjet heads is not limited to the example described above and may be modified in various ways. For example, in the example described above, the inkjet head as the maintenance target is selected in rotation in a preset order. With such a configuration, maintenance can be performed equally for the inkjet heads in the head 12. By contrast, in a modification of the manner of maintenance, the frequency of maintenance may vary among inkjet heads. In this case, for example, the inkjet head as the maintenance target is selected considering how the inkjet heads are used, rather than making a selection equally for all the inkjet heads. For example, in this case, the ejection head as the maintenance target may be selected according to a frequency of use of inkjet heads.

More specifically, for example, when the frequency of use varies among the plurality of inkjet heads in the building apparatus 10, the interval of maintenance of the inkjet head frequently used may be set to be shorter than the interval of maintenance of the inkjet head less frequently used. The inkjet head frequently used indicates that, for example, more ink is ejected until completion of building as described above. Such a feature can be considered as, for example, a configuration in which the frequency of maintenance differs between a first inkjet head which is frequently used and a second inkjet head which is less frequently used. In this case, the first inkjet head ejects more ink than the second inkjet head until building of the object is completed. The maintenance unit 18 then selects the inkjet head as the maintenance target in each maintenance operation, for example, such that the number of times maintenance is performed for the first inkjet head is greater than the number of times maintenance is
performed for the second inkjet head until building of an object is completed. With such a configuration, for example, maintenance of the inkjet head frequently used can be performed with higher frequency. Thus, maintenance can be performed appropriately according to the frequency of use of inkjet heads, for example, such that maintenance of the inkjet head frequently used is performed ahead of others.

In the example described above, the maintenance operation performed by the maintenance unit 18 is mainly cleaning of inkjet heads. However, maintenance of the inkjet heads may be maintenance other than cleaning. More specifically, for example, nozzle check may be performed as maintenance of inkjet heads. Nozzle check means, for example, checking an operation of nozzles in an inkjet head. In this case, the maintenance unit 18 has, for example, the function of nozzle check unit (NCU) and checks the operation of each nozzle by allowing each nozzle in the inkjet head to eject ink.

In this case, nozzle check for one inkjet head usually requires a certain amount of time (for example, about 30 seconds or longer). Performing nozzle check simultaneously for the plurality of inkjet heads requires a plurality of functions of nozzle check units, leading to size increase of the apparatus and cost increase. In this case, the nozzle check units fewer than the inkjet heads in the head 12 (for example, one) may be provided. Then, in this case, if nozzle check is targeted for all the inkjet heads in the head 12 in each time of the maintenance operation, the building stop time involved with each time of maintenance increases, which increases the possibility that noticeable building streaks occur.

Also in such a case, occurrence of unintended noticeable deposition streaks in the object, for example, can be appropriately prevented by reducing the number of inkjet heads targeted for nozzle check in each time of the maintenance operation. In this case, it is preferable that nozzle check is targeted for one inkjet head in each time of the maintenance operation. Such a configuration, for example, can appropriately detect an error in ejection characteristics of nozzles in an inkjet head while preventing occurrence of noticeable deposition streaks and the like. This can also appropriately prevent the inkjet head with an error from keeping building, for example.

In the maintenance unit 18, different kinds of processes may be performed as the maintenance operation. More specifically, in the maintenance unit 18, for example, both cleaning and nozzle check may be performed. In this case, for example, cleaning and nozzle check may be performed regularly for each inkjet head in the head 12. In this case, if an error of the nozzle is detected in nozzle check, for example, cleaning involved with the detection of an error may be further performed for the inkjet head, in addition to cleaning performed regularly. In this case, it is preferable that nozzle check and cleaning are performed such that the building stop time involved with each time of the maintenance operation is sufficiently reduced depending on the desired quality and the like of building.

When different kinds of processes are performed as a maintenance operation performed in the maintenance unit 18, some of the processes may be targeted for all the inkjet heads in the head 12 in each time of the maintenance operation. More specifically, as described above, the maintenance unit 18 may allow the inkjet heads to perform flushing. In this case, flushing may be performed for a short time, for example, about 3 to 5 seconds. Moreover, it is relatively easy to allow the plurality of inkjet heads to perform flushing simultaneously. Thus, flushing is unlikely to excessively increase the building stop time even when all the inkjet heads are targeted in each time of the maintenance operation. Then, when inkjet heads perform flushing as part of maintenance performed in the maintenance unit 18, flushing may be targeted for all the inkjet heads in the head 12 in each maintenance operation. Alternatively, flushing may be targeted for only part of the inkjet heads in the head 12 (for example, one inkjet head) in each time of the maintenance operation, depending on the combination with other processes of maintenance and the desired quality and the like of building.

As described above, when building is performed using UV curable ink through the normal operation of building, noticeable deposition streaks are likely to occur. However, in a further modification of the operation of building, the manner of radiation of ultraviolet rays may be changed to suppress the problem associated with the longer building stop time, for example.

Figure 5:
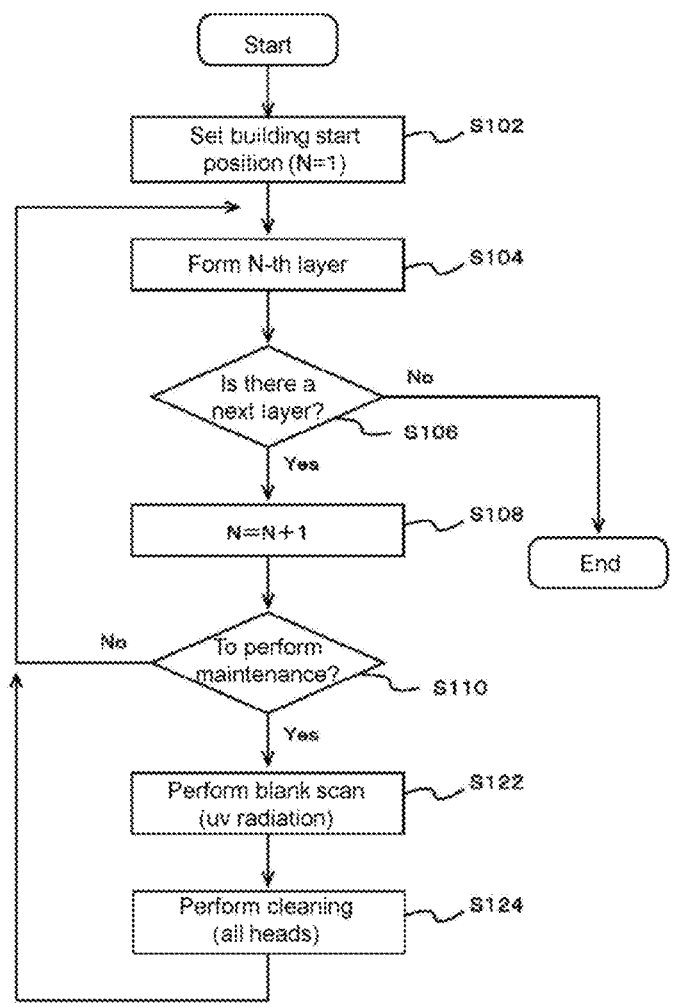
FIG. 5 is a flowchart illustrating a further modification of the operation of building.

FIG. 5 is a flowchart illustrating a further modification of the operation of building. The operation of building performed in the present modification is the same or similar as the operation of building described with reference to FIG. 1 to FIG. 4, except for the points described below. The operation of building in the present modification is performed, for example, using the building apparatus 10 having a configuration illustrated in FIGS. 1A and 1B.

In FIG. 5, the steps denoted by the same reference numerals as in FIG. 2 are the steps for performing the same or similar operation as in the steps in FIG. 2. For example, in the operation of building performed in the present modification, the operation (S102 to S110) up to the determination as to whether to perform maintenance of the inkjet head by the maintenance unit 18 (see FIGS. 1A and 1B) and the operation when it is determined not to perform maintenance (No at S110) are the same or similar as the operation illustrated in FIG. 2. However, the operation when it is determined to perform maintenance (Yes at S110) differs from the operation illustrated in FIG. 2.

More specifically, in the present modification, if it is determined to perform maintenance (Yes at S110), the UV light sources 104 (see FIGS. 1A and 1B) are turned on, and a blank scan is performed in which the head 12 (see FIGS. 1A and 1B) is moved in the main scanning direction with the inkjet heads not ejecting ink, whereby the built surface of the object is additionally irradiated with ultraviolet rays in an interval between two successive main scanning operations performed before and after maintenance (S122). In this case, the built surface of the object refers to, for example, the top surface of the object being built. For example, such a configuration further ensures that the ink of the built surface of the object is cured immediately before maintenance is performed. With this configuration, for example, the state of the built surface is less likely to change even when the building stop time involved with each time of maintenance is long. That is, in this case, noticeable deposition streaks and the like are less likely to occur even when maintenance is performed for a long time.

In this modification, cleaning of the inkjet heads in the head 12 is performed after the blank scan is performed (S124). In this case, cleaning is performed for all the inkjet heads in the head 12 in each time of the maintenance operation. In this case, for example, cleaning of the inkjet heads is performed in order using one wiper. After cleaning of all the inkjet heads is completed, the process returns to step S104 and the subsequent operation is repeated. This modification can also appropriately build an object with high accuracy while appropriately preventing occurrence of noticeable deposition streaks and the like in the object.

When the blank scan is performed immediately before maintenance as in this modification, the manner of formation of a layer of ink at that timing differs from the other layers. Therefore, in this case, the state of the layer of ink and/or the relation with the upper and lower layers of ink may be slightly different from the other layers. Therefore, when building with higher quality is desired, for example, it may be preferable to perform the operation of building illustrated in FIG. 2. On the other hand, it may be more preferable to perform the operation of building as illustrated in FIG. 5, depending on the desired quality of building and a specific configuration of the building apparatus 10.

To further ensure that each layer of ink is cured, for example, the intensity of ultraviolet rays emitted in each main scanning operation may be sufficiently increased. More specifically, in this case, for example, the integrated amount of ultraviolet rays irradiating each position of the built surface while one layer of ink is formed may be set so as to substantially eliminate the difference in appearance of deposition streaks between when the next layer of ink is formed without performing cleaning or the like and when the next layer of ink is formed with interruption of cleaning of all the inkjet heads in the head 12. Such a configuration can also appropriately prevent, for example, occurrence of noticeable deposition streaks in the object. However, when ultraviolet rays are emitted in this manner, for example, power consumption increase in the UV light sources 104 and size increase of the UV light sources 104 may occur. For example, curing of a layer of ink may proceed excessively compared with the normal use of UV curable ink. In view of these things, therefore, for example, the operation of building illustrated in FIG. 2 and the like may be more preferable.

Figure 6A:
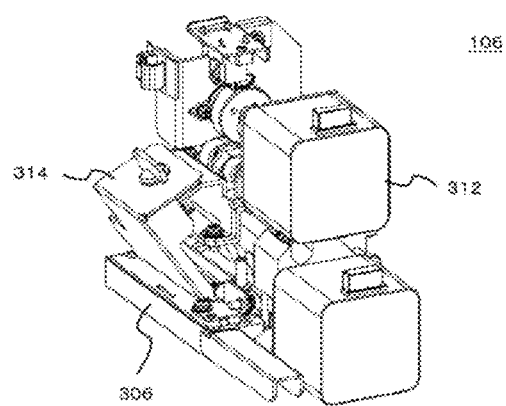
Figure 6B:
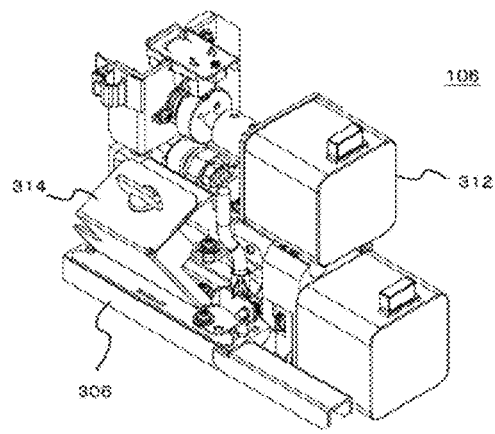
Figure 7A:
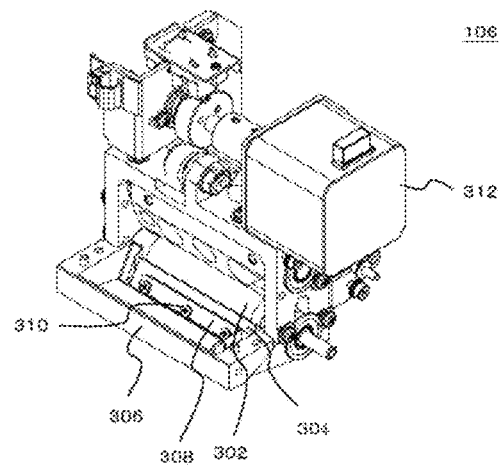
Figure 7B:
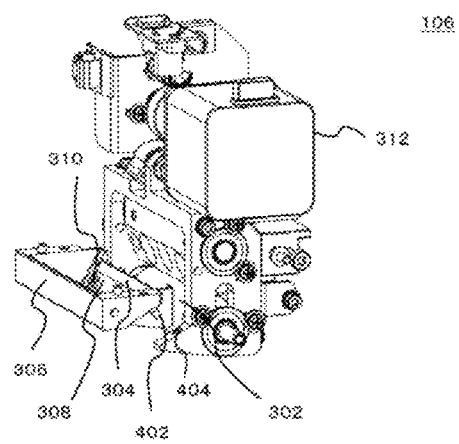

Remarks to the configuration of the flattening roller unit 106 in the head 12 will now be described. In the configuration described above, the building apparatus 10 flattens a layer of ink using a flattening roller in the flattening roller unit 106. An exemplary configuration of the flattening roller unit 106 will be described below. FIGS. 6A and 6B and FIGS. 7A and 7B are diagrams illustrating an exemplary configuration of the flattening roller unit 106. More specifically, FIGS. 6A and 6B are perspective views of the flattening roller unit 106 as viewed from different angles. FIG. 7A is a perspective view of the flattening roller unit 106 with a fixing member 314 being removed from the flattening roller unit 106. FIG. 7B is a perspective view of a state in which the fixing member 314 is removed and an ink tray 306 and the like are further detached from the other part of the flattening roller unit 106. For convenience of explanation, the flattening roller unit 106 illustrated in FIGS. 6A and 6B and FIGS. 7A and 7B is referred to as the flattening roller unit 106 in this example, for example.

In this example, the flattening roller unit 106 has a flattening roller 302, a blade 304, an ink tray 306, a holding plate 308, a plurality of screws 310, a roller driver 312, and a fixing member 314. The flattening roller 302 is a roller for flattening and comes into contact with a layer of ink during the main scanning operation to flatten the layer of ink. In this case, the flattening roller 302 scrapes off the uncured ink to remove ink at a position exceeding a preset thickness from the surface of the layer of ink. With such a configuration, for example, the layer of ink having a preset thickness can be appropriately formed.

In this case, the ink scraped off by the flattening roller 302 is removed by the blade 304 from a surface of the flattening roller 302. The blade 304 is a plate-like member for stripping ink from the surface of the flattening roller 302 and comes into contact with the surface of the flattening roller 302 rotating to remove ink from the surface of the flattening roller 302. In this example, the blade 304 is fixed to the ink tray 306 using the holding plate 308 and the plurality of screws 310. The blade 304 is thus detachable together with the ink tray 306 from the roller driver 312, for example, as illustrated in FIG. 7B.

The ink tray 306 is a container for storing ink removed from the surface of the flattening roller 302 by the blade 304. The ink stored in the ink tray 306 may be sucked, for example, by a pump and discharged to the outside of the flattening roller unit 106. For example, this configuration can appropriately remove the ink scraped off by the flattening roller 302. As described above, in this example, the ink tray 306 is detachable from the roller driver 312. The ink tray 306 has a positioner 402 for aligning the ink tray 306 with the roller driver 312. More specifically, in this example, the positioner 402 is a protrusion formed at a predetermined position in the ink tray 306 as illustrated in the figure. Although the figure illustrates only one positioner 402, the ink tray 306 has a plurality of positioners 402 formed at positions different from each other, in this example.

The holding plate 308 and the plurality of screws 310 are members for fixing the blade 304 to the ink tray 306. The holding plate 308 overlaps with part of the blade 304 to hold and fix the blade 304 at a predetermined position, for example, as illustrated in FIG. 7A. More specifically, in this example, the holding plate 308 fixes the blade 304 such that one end side of the blade 304 is located at a predetermined position on the bottom surface of the ink tray 306. In this case, the other end side of the blade 304 is located at a position that comes into contact with the flattening roller 302 to remove ink from the flattening roller 302. In this example, three screws 310 are used as the plurality of screws 310, for example, as illustrated in FIG. 7A. In a state in which the blade 304 and the holding plate 308 overlap each other at a predetermined position, the blade 304 is fixed to the holding plate 308 with three screws 310. With such a configuration, for example, the blade 304 can be fixed appropriately at a predetermined position.

The roller driver 312 is a driver that rotates the flattening roller 302. In the flattening roller unit 106 in this example, the roller driver 312 forms a housing portion (body) of the flattening roller unit 106 as illustrated in the figures and has a motor, a transmission, etc. for driving the flattening roller 302. The roller driver 312 has a positioner 404 corresponding to the positioner 402 in the ink tray 306. The positioner 404 is a hole fitted to the protruding positioner 402 and receives the corresponding positioner 402 so that the ink tray 306 is aligned with the roller driver 312. The roller driver 312 has a plurality of positioners 404 corresponding to the plurality of positioners 402 in the ink tray 306. In this example, the ink tray 306 is attached to the roller driver 312 so as to be aligned by the positioners 402 and the positioners 404 and is then fixed to the roller driver 312 using the fixing member 314. The fixing member 314 is a member for fixing the ink tray 306 to the roller driver 312 and fixes the ink tray 306 to the roller driver 312 using, for example, screws illustrated in the figure.

According to this example, for example, flattening by the flattening roller unit 106 can be performed appropriately. In this case, the blade 304, the ink tray 306, and the like are detachable from the roller driver 312 to facilitate, for example, replacement of the blade 304 and cleaning of the ink tray 306. More specifically, for example, when the blade 304 is worn, the blade 304 can be replaced easily and appropriately. Regular replacement of the blade 304, for example, can also be performed easily and appropriately.

For example, when the contamination of the ink tray 306 becomes serious or ink hardens in the ink tray 306, the ink tray 306 can be removed and easily cleaned. In this case, the configuration of fixing the blade 304 to the ink tray 306 using the holding plate 308, the screws 310, and the like allows the blade 304 to be aligned easily and appropriately. This also further facilitates the replacement of the blade 304, for example.

INDUSTRIAL APPLICABILITY

The present invention can be suitably used, for example, in a building apparatus.

It will be apparent to those skilled in the art that various modifications and variations can be made to the disclosed embodiments without departing from the scope or spirit of the invention. In view of the foregoing, it is intended that the invention covers modifications and variations provided that they fall within the scope of the following claims and their equivalents.

What is claimed is:

1. A building apparatus configured to build a three-dimensional (3D) object, the building apparatus comprising:
   a plurality of ejection heads each configured to eject a material used for building the 3D object, and the plurality of ejection heads is an inkjet head having a nozzle configured to eject the material by an inkjet;
   a scanning driver configured to allow the plurality of ejection heads to perform a scanning operation of moving relative to the 3D object being built; and
   a maintenance controller configured to allow a maintenance operation of the plurality of ejection heads to be performed,
   wherein the scanning driver allows the plurality of ejection heads to perform at least a main scanning operation of ejecting the material while moving in a main scanning direction relative to the 3D object being built, the plurality of ejection heads repeatedly preforms the main scanning operation multiple times until building of the 3D object is completed,
   wherein the plurality of ejection heads is provided with a first number of ejection heads,
   wherein the maintenance controller is capable of performing maintenance on all of the plurality of ejection heads,
   wherein the maintenance controller performs the maintenance operation of the plurality of ejection heads in an interval between two successive main scanning operations of the main scanning operation performed multiple times and performs the maintenance operation for only part of the plurality of ejection heads in each time of the maintenance operation performed in the interval between the two successive main scanning operations, and
   wherein the only part of the plurality of ejection heads is provided with a second number of ejection heads, and the second number is smaller than the first number,
   wherein the maintenance controller checks an operation of the nozzle in the plurality of ejection heads as a predetermined maintenance of the plurality of ejection heads,
   wherein the maintenance operation comprises a first maintenance and a second maintenance, a time for performing the second maintenance is longer than a time for performing the first maintenance once, and the predetermined maintenance is the second maintenance.

2. The building apparatus according to claim 1, further comprising an ultraviolet light source configured to emit ultraviolet rays, wherein
   each of the plurality of ejection heads ejects the material to be cured by radiation of the ultraviolet rays, and
   the ultraviolet light source emits the ultraviolet rays during the main scanning operation to irradiate the material ejected by the plurality of ejection heads with the ultraviolet rays.

3. The building apparatus according to claim 1, wherein the maintenance controller performs the maintenance operation multiple times until building of the 3D object is completed by performing the maintenance operation at each of predetermined timings with multiple times of the main scanning operation interposed and selects the plurality of ejection heads not targeted in previous maintenance operation as the plurality of ejection heads serving as a maintenance target in each maintenance operation.

4. The building apparatus according to claim 1, wherein the maintenance controller performs the maintenance operation multiple times until building of the 3D object is completed by performing the maintenance operation at each of predetermined timings with multiple times of the main scanning operation interposed and performs the maintenance operation of only one of the plurality of ejection heads in each maintenance operation.

5. The building apparatus according to claim 1, wherein the plurality of ejection heads comprise a first ejection head and a second ejection head,
   the first ejection head ejects a larger amount of the material than the second ejection head until building of the 3D object is completed,
   the maintenance controller performs the maintenance operation multiple times until building of the 3D object is completed by performing the maintenance operation at each of predetermined timings with multiple times of the main scanning operation interposed and selects the plurality of ejection heads as a maintenance target in each maintenance operation such that a number of times the maintenance operation is performed for the first ejection head is greater than a number of times the maintenance operation is performed for the second ejection head until building of the 3D object is completed.

6. The building apparatus according to claim 1, wherein the building apparatus builds the 3D object by depositing layers of the material in a deposition scanning direction orthogonal to the main scanning direction,
   the scanning driver allows the plurality of ejection heads to further perform a deposition scanning operation of moving in the deposition scanning direction relative to the 3D object being built as the scanning operation and allows the plurality of ejection heads to perform the deposition scanning operation multiple times until building of the 3D object is completed,
   the maintenance controller performs the maintenance operation of the plurality of ejection heads in an interval between the main scanning operation and the deposition scanning operation, and
   the scanning driver allows the plurality of ejection heads to perform another main scanning operation after the maintenance operation of the plurality of ejection heads by the maintenance controller is completed.

7. The building apparatus according to claim 1, wherein the maintenance controller performs cleaning of the plurality of ejection heads as the maintenance operation of the plurality of ejection heads.

8. The building apparatus according to claim 2, wherein the maintenance controller performs the maintenance operation multiple times until building of the 3D object is completed by performing the maintenance operation at each of predetermined timings with multiple times of the main scanning operation interposed and selects the plurality of ejection heads not targeted in previous maintenance operation as the plurality of ejection heads serving as a maintenance target in each maintenance operation.

9. The building apparatus according to claim 2, wherein the maintenance controller performs the maintenance operation multiple times until building of the 3D object is completed by performing the maintenance operation at each of predetermined timings with multiple times of the main scanning operation interposed and performs the maintenance operation of only one of the plurality of ejection heads in each maintenance operation.

10. The building apparatus according to claim 3, wherein the maintenance controller performs the maintenance operation multiple times until building of the 3D object is completed by performing the maintenance operation at each of predetermined timings with multiple times of the main scanning operation interposed and performs the maintenance operation of only one of the plurality of ejection heads in each maintenance operation.

11. The building apparatus according to claim 2, wherein
the plurality of ejection heads comprise a first ejection head and a second ejection head,
the first ejection head ejects a larger amount of the material than the second ejection head until building of the 3D object is completed,
the maintenance controller performs the maintenance operation multiple times until building of the 3D object is completed by performing the maintenance operation at each of predetermined timings with multiple times of the main scanning operation interposed and selects the plurality of ejection heads as a maintenance target in each maintenance operation such that a number of times the maintenance operation is performed for the first ejection head is greater than a number of times the maintenance operation is performed for the second ejection head until building of the 3D object is completed.

12. The building apparatus according to claim 3, wherein
the plurality of ejection heads comprise a first ejection head and a second ejection head,
the first ejection head ejects a larger amount of the material than the second ejection head until building of the 3D object is completed,
the maintenance controller performs the maintenance operation multiple times until building of the 3D object is completed by performing the maintenance operation at each of predetermined timings with multiple times of the main scanning operation interposed and selects the plurality of ejection heads as a maintenance target in each maintenance operation such that a number of times the maintenance operation is performed for the first ejection head is greater than a number of times the maintenance operation is performed for the second ejection head until building of the 3D object is completed.

13. The building apparatus according to claim 4, wherein
the plurality of ejection heads comprise a first ejection head and a second ejection head,
the first ejection head ejects a larger amount of the material than the second ejection head until building of the 3D object is completed,
the maintenance controller performs the maintenance operation multiple times until building of the 3D object is completed by performing the maintenance operation at each of predetermined timings with multiple times of the main scanning operation interposed and selects the plurality of ejection heads as a maintenance target in each maintenance operation such that a number of times the maintenance operation is performed for the first ejection head is greater than a number of times the maintenance operation is performed for the second ejection head until building of the 3D object is completed.

14. A building method of building a three-dimensional (3D) object, comprising:
allowing a plurality of ejection heads to perform a scanning operation of moving relative to the 3D object being built, the plurality of ejection heads each ejecting a material used for building the 3D object, and the plurality of ejection heads is an inkjet head having a nozzle configured to eject the material by an inkjet;
allowing a maintenance controller to perform a maintenance operation of the plurality of ejection heads, wherein the plurality of ejection heads is provided with a first number of ejection heads, and the maintenance controller is capable of performing maintenance on all of the plurality of ejection heads;
allowing the plurality of ejection heads to perform at least a main scanning operation of ejecting the material while moving in a main scanning direction relative to the 3D object being built, as the scanning operation, and allowing the plurality of ejection heads to perform the main scanning operation multiple times until building of the 3D object is completed; and
allowing the maintenance controller to perform the maintenance operation of the plurality of ejection heads in an interval between two successive main scanning operations of the main scanning operation performed multiple times and allowing the maintenance controller to perform a predetermined maintenance for checking an operation of an nozzle in only part of the plurality of ejection heads in each time of maintenance operation performed in the interval between the two successive main scanning operations, wherein the only part of the plurality of ejection heads is provided with a second number of ejection heads, and the second number is smaller than the first number,
wherein the maintenance operation comprises a first maintenance and a second maintenance, a time for performing the second maintenance is longer than a time for performing the first maintenance once, and the predetermined maintenance is the second maintenance.

15. A building apparatus configured to build a three-dimensional (3D) object, comprising:
a plurality of ejection heads each configured to eject a material used for building the 3D object, and the plurality of ejection heads is an inkjet head having a nozzle configured to eject the material by an inkjet;
an ultraviolet light source configured to emit ultraviolet rays;
a scanning driver configured to allow the plurality of ejection heads to perform a scanning operation of moving relative to the 3D object being built; and
a maintenance controller configured to allow the maintenance operation of the plurality of ejection heads to be performed, wherein
each of the plurality of ejection heads ejects the material to be cured by radiation of ultraviolet rays, the scanning driver allows the plurality of ejection heads to perform at least a main scanning operation of ejecting the material while moving in a main scanning direction relative to the 3D object being built, the plurality of ejection heads repeatedly preforms the main scanning operation multiple times until building of the 3D object is completed, the ultraviolet light source emits ultraviolet rays during the main scanning operation to irradiate the material ejected by the plurality of ejection heads with ultraviolet rays, wherein the plurality of ejection heads is provided with a first number of ejection heads, wherein the maintenance controller is capable of performing maintenance on all of the plurality of ejection heads, the maintenance controller performs a maintenance operation of the plurality of ejection heads in an interval between two successive main scanning operations of the main scanning operation performed multiple times, in an interval between the two successive main scanning operations, the ultraviolet light source further irradiates a built surface of the 3D object with ultraviolet rays, and the maintenance controller performs the maintenance operation for only part of the plurality of ejection heads in each time of the maintenance operation performed in the interval between the two successive main scanning operations, wherein the only part of the plurality of ejection heads is provided with a second number of ejection heads, and the second number is smaller than the first number, the maintenance controller checks an operation of the nozzle in the plurality of ejection heads as a predetermined maintenance of the plurality of ejection heads, the maintenance operation comprises a first maintenance and a second maintenance, a time for performing the second maintenance is longer than a time for performing the first maintenance once, and the predetermined maintenance is the second maintenance.

\* \* \* \* \*